US010241785B2

(12) United States Patent
Krajec

(10) Patent No.: US 10,241,785 B2
(45) Date of Patent: Mar. 26, 2019

(54) DETERMINATION OF PRODUCTION VS. DEVELOPMENT USES FROM TRACER DATA

(71) Applicant: MICROSOFT TECHNOLOGY LICENSING, LLC., Redmond, WA (US)

(72) Inventor: Russell Krajec, Loveland, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 15/036,343

(22) PCT Filed: Mar. 27, 2014

(86) PCT No.: PCT/IB2014/060238
§ 371 (c)(1),
(2) Date: May 12, 2016

(87) PCT Pub. No.: WO2015/071776
PCT Pub. Date: May 21, 2015

(65) Prior Publication Data
US 2016/0299759 A1 Oct. 13, 2016

Related U.S. Application Data

(60) Provisional application No. 61/903,727, filed on Nov. 13, 2013, provisional application No. 61/903,733, (Continued)

(51) Int. Cl.
*G06F 9/44* (2018.01)
*G06F 8/77* (2018.01)
(Continued)

(52) U.S. Cl.
CPC ............ *G06F 8/77* (2013.01); *G06F 11/3409* (2013.01); *G06F 11/3612* (2013.01);
(Continued)

(58) Field of Classification Search
USPC ........................................ 717/128, 130, 131
See application file for complete search history.

(56) References Cited

U.S. PATENT DOCUMENTS

| 5,960,196 | A | 9/1999 | Carrier, III et al. |
| 7,509,343 | B1 | 3/2009 | Washburn et al. |
| 2002/0120815 | A1 | 8/2002 | Zahavi et al. |
| 2009/0106741 | A1* | 4/2009 | Dageville ........... G06F 11/3636 717/128 |

(Continued)

FOREIGN PATENT DOCUMENTS

CN 103038752 A 4/2013

OTHER PUBLICATIONS

"First Office Action and Search Report Issued in Chinese Patent Application No. 201480062407.5", dated Jan. 24, 2018, 21 Pages.
(Continued)

*Primary Examiner* — Chuck O Kendall
(74) *Attorney, Agent, or Firm* — Workman Nydegger

(57) ABSTRACT

Production or development uses of an application may be identified from tracing data when the data fits a heuristic. The heuristic may include length of execution run, number of executions, repeating patterns within the execution run, or other factors. Similarly, prototyping or development uses of an application may be identified by frequent code changes, sporadic uses, low loads, and other factors. The production and development uses of an application may be displayed by a uses versus user graph, where production users may be displayed as those users with the largest number of uses. The tracing data may be gathered by monitoring an entire application or from monitoring functions, modules, subroutines, libraries, interfaces, services, or other portions of an application.

57 Claims, 10 Drawing Sheets

Related U.S. Application Data filed on Nov. 13, 2013, provisional application No. 61/903,744, filed on Nov. 13, 2013.

(51) Int. Cl.
- *G06F 11/36* (2006.01)
- *G06F 11/34* (2006.01)
- G06F 8/36 (2018.01)
- G06F 8/73 (2018.01)
- G06F 8/20 (2018.01)

(52) U.S. Cl.
CPC ...... *G06F 11/3616* (2013.01); *G06F 11/3692* (2013.01); *G06F 8/20* (2013.01); *G06F 8/36* (2013.01); *G06F 8/73* (2013.01)

(56) References Cited

U.S. PATENT DOCUMENTS

| | | |
|---|---|---|
| 2012/0079456 A1 | 3/2012 | Kannan |
| 2013/0145350 A1 | 6/2013 | Marinescu |
| 2013/0283241 A1 | 10/2013 | Kraject et al. |
| 2013/0283242 A1 | 10/2013 | Gounares |

OTHER PUBLICATIONS

"Supplementary Search Report Issued in European Patent Application No. 14862163.4", dated Jun. 20, 2017, 9 Pages.

"Second Office Action Issued in Chinese Patent Application No. 201480062407.5", dated Sep. 13, 2018, 29 Pages.

\* cited by examiner

DETERMINATION OF PRODUCTION VS. DEVELOPMENT USES FROM TRACER DATA

CROSS REFERENCE TO RELATED APPLICATIONS

This patent application claims priority to and benefit of U.S. Patent Application Ser. No. 61/903,727 entitled "Determination of Production vs. Development Used from Tracer Data" filed 13 Nov. 2013, U.S. Patent Application Ser. No. 61/903,733 entitled "Analysis of Production Use Tracer Data to Determine Production-Related Metrics" filed 13 Nov. 2013, and U.S. Patent Application Ser. No. 61/903,744 entitled "Module Search and Browse System with Production-Related Metrics" filed 13 Nov. 2013, all of which are hereby expressly incorporated by reference for all they disclose and teach.

BACKGROUND

Application tracing is one mechanism to understand and monitor an application. Tracing is a mechanism to collect data while the application executes. In some uses, application tracing may be used for monitoring the ongoing performance of an application. In other uses, application tracing may be used by a developer to understand an application, identify any problems, and improve the application.

SUMMARY

Production or development uses of an application may be identified from tracing data when the data fits a heuristic. The heuristic may include length of execution run, number of executions, repeating patterns within the execution run, or other factors. Similarly, prototyping or development uses of an application may be identified by frequent code changes, sporadic uses, low loads, and other factors. The production and development uses of an application may be displayed by a uses versus user graph, where production users may be displayed as those users with the largest number of uses. The tracing data may be gathered by monitoring an entire application or from monitoring functions, modules, subroutines, libraries, interfaces, services, or other portions of an application.

Tracing data from production uses of an application may be treated differently than development uses for analysis purposes. Long term performance analyses may be performed against production trace data, but not against development trace data, as development trace data may have substantially different behavior characteristics. Production trace data may be analyzed to determine an application's or function's robustness, fragility, stability, tolerance to load changes, or other metrics that may be useful in rating the application or function for production use or for identifying potential areas of improvement to the function.

Production uses of tracing data may be collected for individual modules or libraries of code, as those modules are exercised in different applications. The aggregated production data across multiple applications may be presented as part of a module reference or selection system. The production data may be summarized into a production worthiness score or other summary metric. Such summarization may indicate the conditions under which the module may or may not be suitable for production uses. A module search system may rank modules based on their various metrics derived from production usage data, as well as allow users to search or browse using the metrics.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
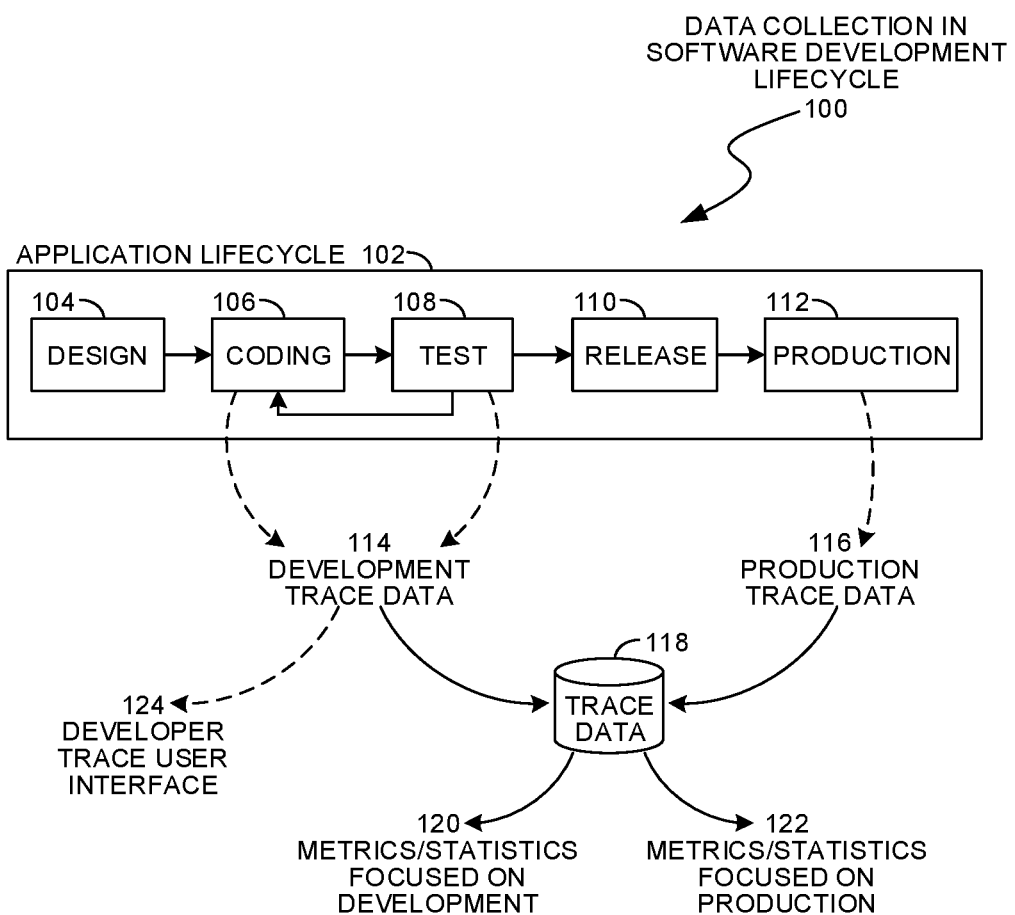
FIG. 1 is a diagram illustration of an embodiment showing data collection in a software development lifecycle.

Determination of Production vs. Development Uses from Tracer Data

A tracing system may collect data when an application or application component may be executed. The executions may be done under different circumstances, including production uses and development/development uses. The data collected during production use may have different uses and characteristics than data collected during prototyping. As such, the data may be differentiated through heuristics or other mechanisms.

The term "production" may refer to using a computer software application or application component in its intended end use and under load. Conversely, the term "development" use may refer to the phase of use where a computer software application may be in the process of being written, refined, debugged, and otherwise prepared for production. In many cases, the development phase of a software application's lifecycle may include exercising the application under simulated or real loads while debugging or testing the application. Once testing has been completed, the application may be released into "production" where the application may be deployed to handle real loads.

Production tracer data may have different uses than development trace data. For example, production tracer may be used to give indicators regarding robustness, fragility, stability, and other production-related factors that may be useful for developers. By separating production trace data from development trace data, the analysis of production-related indicators may not be negatively affected by the presence of development trace data.

Development trace data, similarly, may give indicators about improvements/regression of an application as development and testing occurs. Such data may be adversely affected by the presence of production trace data.

Production trace data may be identified by several different mechanisms. A heuristic or set of heuristics may be applied to separate production tracer data from development tracer data. The data being handled by the application or application component may be analyzed to identify and separate test data from production data. In some cases, a developer may expressly identify one set of devices for production operation and a second set of devices for prototyping, while in other cases, such groups of devices may be implied.

A heuristic may identify production trace data by identifying the operational behavior of the application. In a typical production environment, an application may be executed for extended periods of time and may also be exposed to incoming data that may have periodicity or other regular features. In such environments, a production operation may be those sets of trace data that exceed a predefined minimum of extended execution time, and in some cases be further identified when the incoming load may have observed periodicity or other features.

Development trace data may be identified by analyzing the incoming data or loads experienced by the application. In many prototyping and test environments, data loads for an application may be designed as part of a testing regime for the application. These data loads may have characteristics that may be known or inferred to be development data sets. For example, some data sets used for load testing may include markers or identifiers in the data itself that may be analyzed by a tracer or through tracer data to identify an execution run as a development execution run.

A developer may give express or implied indications regarding the development or production execution of an application. These indications may be derived from various metadata or operational data that may be collected by a tracer or other mechanism. The developer may set flags, use a naming convention, go through a production release cycle, store an application in a different directory or with different metadata, move an application to a different hardware platform, or perform some other operation when an application changes from development execution to production execution. In some embodiments, the express indication of production versus development execution may be determined prior to collecting tracer data, and all subsequent tracer data may be classified as production or development based on the determination.

A developer may indicate a production or development operation of an application by a setting or configuration of a tracer. Some tracers may be configured to provide a larger or more detailed dataset during development phase and a different dataset in production mode. Such configurations may be used as an indicator as to whether a particular dataset may be classified as a production or development dataset.

In general, development code may be changed more often than production code. During the development and development phase, the code base of an application may be continually updated and tested. Over time, the changes may be less substantial until the application may be released to production. Once in production, the application may undergo minimal changes. When source code or other metadata may be available, a determination of production/development status may be made by analyzing any changes of the source code. Such analyses may be performed using metadata, such metadata may include the number of lines of code in the application, version numbers, timestamp of the last change to the application, or some other metadata.

A heuristic may be applied to data for which the production/development status may not be known, then various metadata may be analyzed to determine which metadata factors may correlate with the production/development status of the tracer data. In such an embodiment, a tracer may collect various metadata as part of a data collection operation. The tracer data may be analyzed to identify one or more data sets as either production or development data sets. Once the determination may be made, the metadata may be analyzed to identify those metadata items may be correlate with production or development operations. When the correlation has met a statistical confidence, the production/development determination may be made by both heuristic analysis as well as by metadata analysis. In some cases, after a correlation has been made between one or more metadata items and a production/development designation, the production/development determination may be made by metadata analysis alone.

The tracer data may be analyzed for an entire application or for a subset of an application. The subset may be a single function, module, library, subroutine, interface, application programming interface, or some other software component of an application. In some embodiments, a tracer may be applied to one or more software components and not to an entire application. Other embodiments may trace the entire application.

Analysis of Production Use Tracer Data to Determine Production-Related Metrics

Production sets of tracer data may be used to determine various production related metrics. In general, production related metrics may include any performance or operational characteristic that may indicate how well a computer application or computer application component may operate in a production environment.

Examples of production related metrics may include robustness, fault tolerance, performance under severe or unexpected loads, and other metrics. These metrics may indicate how well an application or application component may operate under production conditions. The metrics may be used by developers to reuse components when the metrics are favorable, or to identify areas where an application or its components may be improved.

Production related metrics may be derived from production tracer data. In many cases, tracer data may be gathered in both a development phase and a production phase of an application's or application component's lifecycle. Tracer data for the production phase may be separated from the development phase, and the production tracer data may be analyzed to generate production related metrics without using the development tracer data. In some cases, production related metrics may be generated using both development and production tracer data, and different weighting may be applied to development tracer data than production tracer data. In general, such weighting may give larger emphasis to production tracer data and less emphasis to development tracer data.

The separation of production tracer data from development tracer data may remove negative effects that development tracer data may have on production related metrics. In many cases, production related metrics may emphasize stability and long term operation under changing loads or conditions. In contrast, tracer data gathered during prototyping and development may include operating an application under conditions that may cause the application to fail. The failures may be replicated to identify areas to improve the application. After changing the application code, the application may be re-run to determine if the failure can be replicated. Such an example of a prototyping phase may illustrate how development trace data may include many datasets that may not illustrate how well an application may perform in a production environment.

Production related metrics may tend to emphasize longevity of operations, as well as fault tolerance and robustness under varying loads. More favorable metrics may be generated by analyzing datasets collected from long running applications and by discarding datasets collected over shorter periods during prototyping. Such discarding may be valid when the shorter datasets are indeed the results of development and testing and not from production uses of the application.

Module Search and Browse System with Production-Related Metrics

A set of computer application modules may be searched and browsed based on production related metrics. The modules may represent reusable software components for which production trace data may be collected. The production trace data may include usage statistics and metrics that may indicate a module's suitability for production use.

A system may include searching and browsing mechanisms that distinguish between production metrics and development metrics. Production metrics may be gathered from long running examples of a module, or other cases where a module may be deployed in an eventual intended use of the module. The searching and browsing system may include mechanisms for a user to enter a use scenario for a module, then compare modules based on the use scenario.

A use scenario may define how a user may intend to use a module in production. Since each application may have different intended uses, the system may attempt to tailor the statistics for modules to the user's use scenario. The use scenario may include the hardware and software on which the module may be used, along with the forecast usage pattern.

The hardware and software configuration may include specific or generalized hardware platforms, along with the operating system or other software components. The hardware platforms may identify whether the application may be run on a specific platform or a group of platforms. The group of platforms may be quite broad, such as mobile platforms, or may be specific, such as a specific handheld device or those with a specific operating system. The software configuration may include operating system, language support, or other modules in a production system.

The expected usage pattern for an application may include various parameters that describe an intended use. One application may be intended to operate for long periods of time, while another application may be intended to operate once or maybe a handful of times during its lifecycle.

Throughout this specification and claims, the term "module" is used to define a group of reusable code that may be incorporated into an application. A module may be known as a 'library', 'subroutine', or some other notion. For the purposes of this specification and claims, these terms are considered synonymous.

The "module" may be code that is arranged in a way that multiple applications may access the code, even though the applications may have no connection with each other. In general, a "module" may be code that is configured to be reused. In some cases, a module may be reused within the scope of a large application, while in other cases, the module may be shared to other application developers who may use the module in disparate and unconnected applications.

Many programming languages and paradigms have a notion of a "module" or library, where the module may have a defined interface through which an application may invoke and use the module. Some paradigms may allow a programmer to incorporate a module in a static manner, such that the module code does not further change after the application is written and deployed. Some paradigms may allow for dynamic libraries, which may be loaded and invoked at runtime or even after execution has begun. The dynamic libraries may be updated and changed after the application may have been distributed, yet the manner of invoking the libraries or modules may remain the same.

Modules may be distributed in source code, intermediate code, executable code, or in some other form. In some cases, modules may be services that may be invoked through an application programming interface.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration of an embodiment 100 showing data collection that may occur during the lifecycle of an application. Embodiment 100 may represent an application lifecycle 102 and data that may be collected during the development stages and production stages of an application. Those data may be stored in a database and used in various manners.

Embodiment 100 shows some contexts in which trace data and its uses may be discussed. Trace data may be collected when an application executes, and may be immediately useful to a user who may be monitoring that application. However, when trace data may be aggregated and analyzed across multiple executions, the effects of development uses and production uses may adversely affect such analyses. Further, such analyses may aggregate metrics for reusable code modules across multiple applications. By separating development uses from production uses of an application, more meaningful metrics may be generated.

The application lifecycle 102 may represent a typical development and deployment lifecycle of a software product. After design 104, coding 106 and test 108 may occur. The coding 106 and test 108 may loop many times as the code is exercised under different conditions and loads while bugs may be uncovered and features added. At some point, a release 110 may occur, which may transfer the software product may be deployed in production 112. In general, the stages of coding 106 and testing 108 may be referred to as "development".

The transition from development to production may be a formal process in some cases. A formal version of a release process may involve successfully passing a series of tests, in addition to business logic for releasing a product into a marketplace. Such processes may involve signoff from engineering and business managers, as well as other milestones.

Many release processes may be quite informal, where a developer makes a decision to allow other people to use an application or code module. In many cases, such a transition may involve a change from predefined input streams used for testing and undefined input streams.

During the coding 106 and test 108 phases, a tracer may collect development trace data 114. Development trace data 114 may be stored in a trace database 118. In many scenarios, the development trace data 114 may be displayed on a developer trace user interface 124.

The developer trace user interface 124 may be a mechanism where the trace data for a specific execution run may be analyzed and displayed. A typical use scenario may be for a developer to exercise the software component under development and collect trace data, then the developer may display the results of that specific execution run. Such a scenario may be repeated over and over as the developer writes, tests, and modifies the software component under development.

The development trace data 114 may include results generated from an incomplete version of the software component under development. The incompleteness may be a result of the component not being fully coded and where features have not yet been added, or may be the result of not successfully passing various tests that may have been created for the software component. As the software component undergoes the coding 108 and test 108 cycle, the software component may improve and the tracer data may reflect the improvement of the software component.

In contrast, production trace data 116 may be gathered while the software component is being used in production 112. In production 112, many of the bugs or issues encountered in the coding 106 and test 108 phases may have been fixed, and the production trace data 116 may reflect the operations of a software component in a 'finished' state.

The trace database 118 may contain both development trace data 114 and production trace data 116. By analyzing the trace database 118, many different types of useful metrics may be created. For example, an analysis may aggregate the uses of a specific software component or module under different use cases. Such an analysis may generate statistics for the module as used in many different applications or uses. Such information may be useful to the module owner to determine how well the module performed when integrated into many different applications. The same information may be useful to an application developer who may wish to evaluate the module for incorporation into an application under development.

Metrics and statistics focused on development 120 may include metrics that show the progression of an application or software component through the development processes. Such metrics may include reports or metrics that reflect the actual development process, such as the number of bugs identified and fixed over a period of time, or statistics that reflect improvements in reliability, stability, performance, or other metrics as the development cycle continues.

Metrics and statistics focused on production 122 may include metrics that show how well a software component may operate in a production environment. Such metrics may include the long term stability, errors captured, faults encountered, as well as performance metrics captured while the component was under production loads.

In many cases, the production-focused metrics may be corrupted if the metrics were generated using trace data gathered during development. In the development phase, the trace data may reflect errors, bugs, incomplete code, features that may have not yet been implemented, and other factors that may not reflect the performance of the finished and released product. By identifying development trace data 114 and production trace data 116 within the trace database 118 and performing separate analyses of those subsets of trace data, meaningful production statistics may be generated without corruption by development trace data 114.

Figure 2:
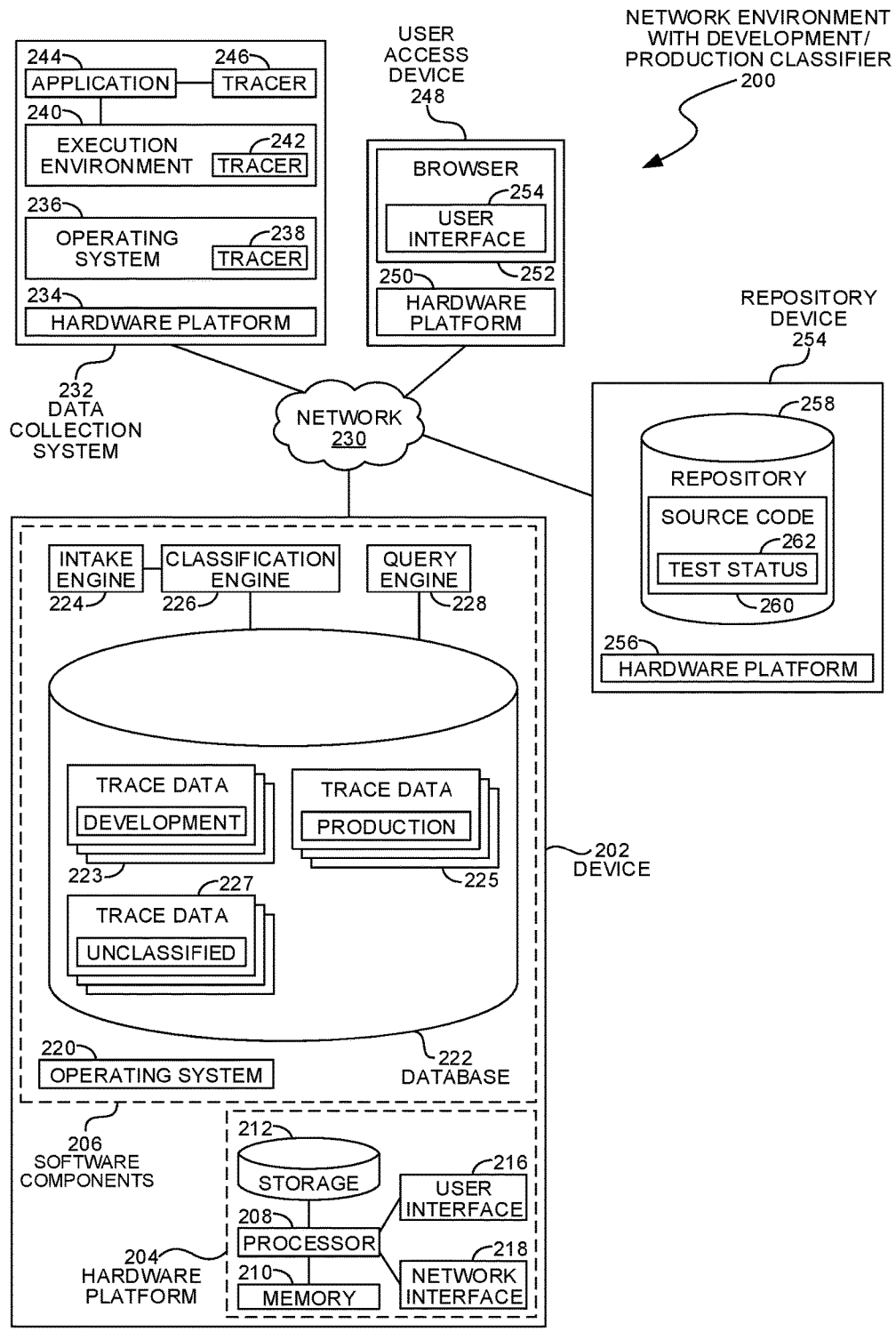
FIG. 2 is a diagram illustration of an embodiment showing a network environment with devices that may collect, analyze, and consume production or development trace data.

FIG. 2 is a diagram of an embodiment 200 showing components that may collect data when an application executes and analyze production and development trace data. The example of embodiment 200 is merely one example of a multi-device system that may generate and view tracer data. Other architectures may include single device and multiple device architectures.

The architecture of embodiment 200 includes a device 202 on which the tracer data may be collected and analyzed, as well as several other devices for creating and accessing different elements of the collected data. In other embodiments, some or all of the functions illustrated may be combined into one or more devices.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. A database 222 may contain trace data classified as development 223, trace data classified as production 225, and trace data that may not be classified 227.

An intake engine 224 may receive trace data from tracers. The tracers may be located on device 202 or on other devices. In the example of embodiment 200, a data collection system 232 may generate the trace data and transmit the trace data to the intake engine 224.

A classification engine 226 may attempt to classify the incoming trace data as either development or production. In some embodiments, the classification engine 226 may be able to analyze an incoming stream of data and apply a classification. In other embodiments, the classification engine 226 may analyze data after it may have been received and stored in the database 222. In such embodiments, the trace data may be received by the intake engine 224 and stored in the database 222 as unclassified trace data 227, then analyzed by the classification engine 226 to apply a classification.

A query engine 228 may receive requests for information derived from the database 222, perform analyses to generate statistics or other information, and return the requested information. In many embodiments, the query engine 228 may include various analysis engines that may perform sophisticated analyses of data in the database 222.

A network 230 may connect the device 202 to various other devices.

A data collection system 232 may be a device that may generate tracer data. The data collection system 232 may operate on a hardware platform 234, which may be similar to the hardware platform 204. The data collection system 232 is illustrated with several different types of tracers.

An application 244 may be executed on the data collection system 232 and a tracer may gather tracer data. A tracer may transmit tracer data to the intake engine 224 of the device 202.

In some embodiments, an application 244 may execute within an operating system 236. In such cases, the operating system 236 may have some or all of a tracer 238 embedded as part of the operating system 236. Some cases may have an external tracer 246 which may operate separately or in conjunction with the embedded tracer 238.

In other embodiments, an application 244 may execute within an execution environment 240. In such cases, the execution environment 240 may have some or all of a tracer 242 embedded as part of the execution environment 240. Some cases may have an external tracer 246 which may operate separately or in conjunction with the embedded tracer 242. In some cases, an embedded tracer 238 in an operating system 236 may provide some or all of the trace data in conjunction with an execution environment tracer 242 and an external tracer 246.

A user access device 248 may have a user interface that shows data retrieved from the query engine 228. The user access device 248 may have a hardware platform 250 that may be similar to the hardware platform 204. A browser 252 may execute on the device 248. Within the browser 252, a user interface 254 may show information and data retrieved from the query engine 228.

The query engine 228 may have an application programming interface (API) which may respond to queries. The application programming interface may allow different applications to send a request to the query engine 228 and then process the response in some manner, such as further processing the response, showing the data in a user interface, or other operation.

A repository device 254 may contain different versions of a software component, as well as metadata that may be used to identify development and production versions of the software component. The repository device 254 may operate on a hardware platform 256, which may be similar to the hardware platform 204.

A repository 258 may be a database that may include various versions of source code 260 along with a test status 262 and other metadata. The test status 262 and other metadata may include information about the development and release lifecycle of an application. Many sophisticated repositories may include lifecycle management features that may indicate where a software component may be with respect to its development and deployment lifecycle. Such information may be used by a classification engine 226 to classify trace data as development or production.

Figure 3:
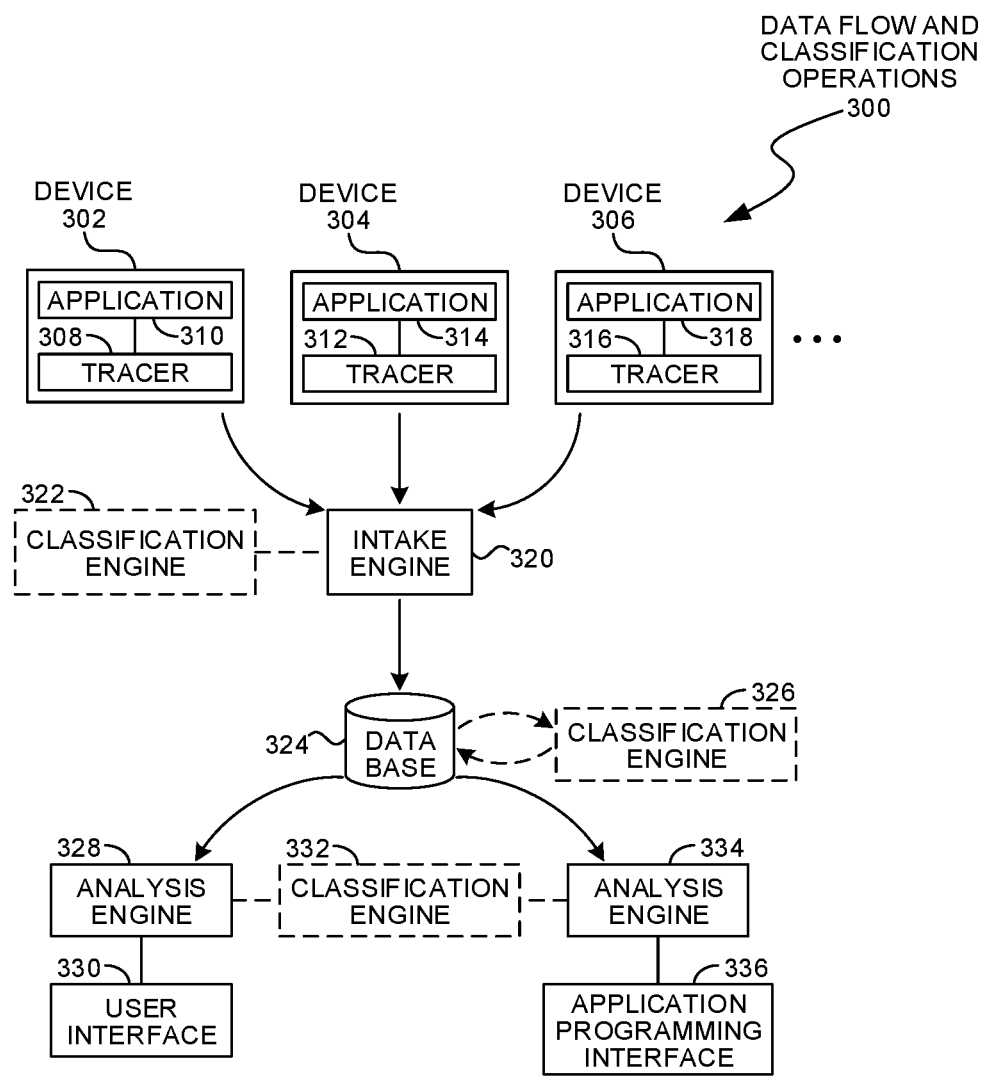
FIG. 3 is a diagram illustration of an embodiment showing data flow and classification operations.

FIG. 3 is an example embodiment 300 showing various sequences for collecting and analyzing tracer data. The tracer data may be classified at various stages during the sequence.

Embodiment 300 illustrates classification engines that may execute prior to storing trace data, as well as examples of a classification engine that may execute after storing trace data and before analysis, and another classification engine that may execute as part of analysis of the trace data. These examples are meant to illustrate several different architectures of classification engines.

In some architectures, multiple classification engines may operate in conjunction with each other. In one such architecture, one classification engine may perform a preliminary analysis that may be verified or confirmed by a subsequent analysis. In another such architecture, a subsequent classification analysis may overturn or change a previous classification analysis.

Multiple devices 302, 304, and 306 may provide tracer data. Tracers 308, 312, and 316 may collect data from applications 310, 314, and 318, respectively. The applications 310, 314, and 318 may be the same application or different applications. In many cases, different applications may contain the same software component.

Each of the various tracers may transmit tracer data to an intake engine 320. The intake engine 320 may have a classification engine 322, which may classify the incoming tracer data before the data are stored in a tracer database 324. The classification engine 322 may be a lightweight process that may process incoming streams of data. In some cases, the classification engine 322 may perform a preliminary classification, which may be later verified or confirmed by later classification analyses.

After storing data in the database 324, a classification engine 326 may analyze stored data, perform a classification analysis, and update the classification of various tracer datasets.

Once data are stored in the database 324, an analysis engine 328 may perform various analyses and generate data that may be displayed in a user interface 330. In such a case, a classification engine 332 may be called at the analysis stage to classify trace datasets prior to or as part of various analyses. Similarly, an analysis engine 334 may use a classification engine 332 to respond to queries through an application programming interface 336.

Figure 4:
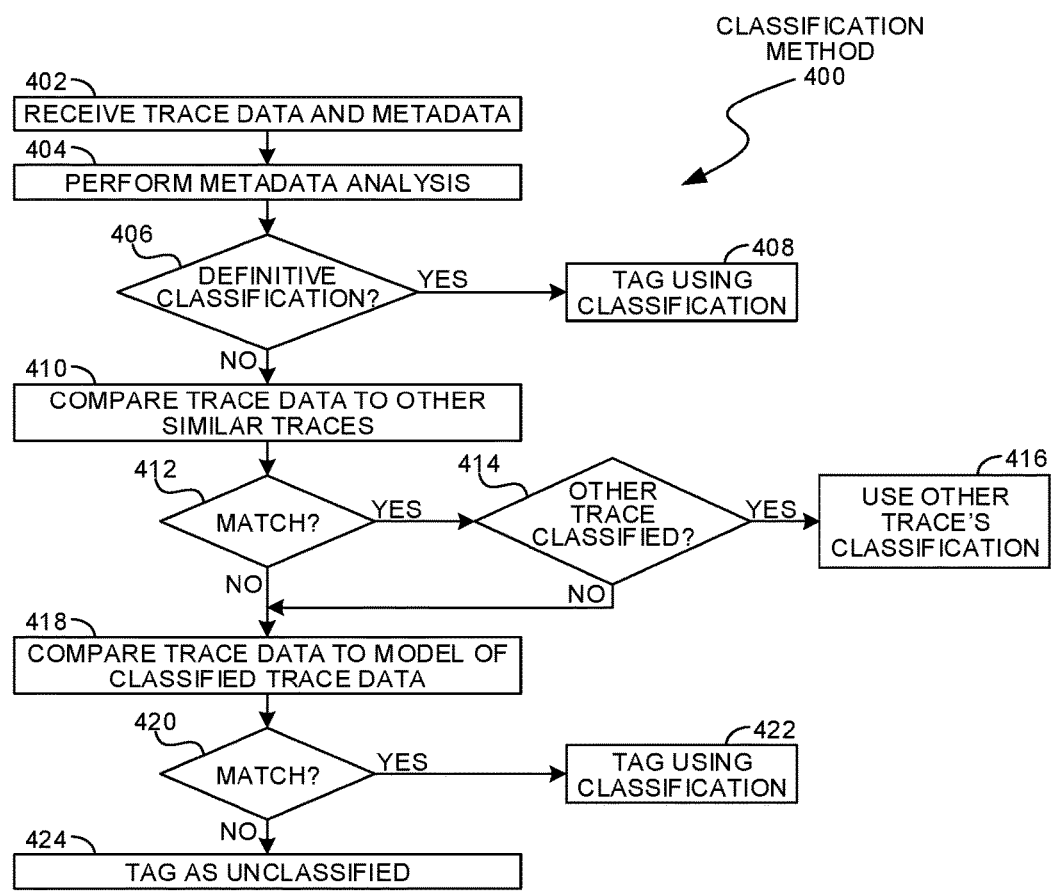
FIG. 4 is a flowchart illustration of an embodiment showing a method for classifying trace datasets.

FIG. 4 is a flowchart illustration of an embodiment 400 showing a method for classifying tracer data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may illustrate a high level process for classifying tracer data. In many cases, tracer datasets may be time series data that may be gathered periodically while monitoring an application or software component. The classification of a dataset may be performed while collecting a time series dataset, or may be performed after the entire dataset has been collected.

The trace data and metadata may be received in block 402. The trace data may be in the form of one or more time series datasets. Such time series may include performance and other data that may be collected by monitoring an application using a tracer. Such data may be collected at predefined periodic intervals. In other embodiments, the data may be collected in response to various events or other conditions.

The metadata may include any type of information that may be gathered in addition to the actual trace data. Such metadata may include information about the hardware, software, or other conditions under which an application may be executed, information about the source code, compilation, execution, repository information, or other information.

A metadata analysis may be performed in block 404. A more detailed example of metadata analysis may be illustrated later in this specification.

If the metadata analysis produces a definitive classification in block 406, the trace data may be tagged using that classification in block 408.

An analysis may compare the trace data to other similar traces in block 410. The analysis of block 410 may attempt to correlate the trace data with other trace datasets. If there is a match in block 412 and the other trace dataset is already classified in block 414, the other trace's classification may be applied to the current trace dataset in block 416. If the other trace dataset is not classified in block 414 or if there may not be a match in block 412, the process may continue at block 418.

The comparison of two trace datasets may be performed in any manner that may have a statistical correlation between the two datasets. When a statistical similarity may be determined and the other dataset has a known classification, the classification may be applied to the new dataset.

A model of classified datasets may be used to compare and classify a trace dataset in block 418. When there is a statistically significant match in block 420, the classification may be applied in block 422, otherwise the trace dataset may be tagged as unclassified.

In block 418, multiple datasets may be analyzed to generate a model for a certain classification of datasets, such as a model for development trace datasets and a second model for production trace datasets. The models may be compared to a trace dataset to determine a correlation or match. Based on the statistical significance of the match, a classification may be made. In some instances, no match may be found to be statistically significant.

Figure 5:
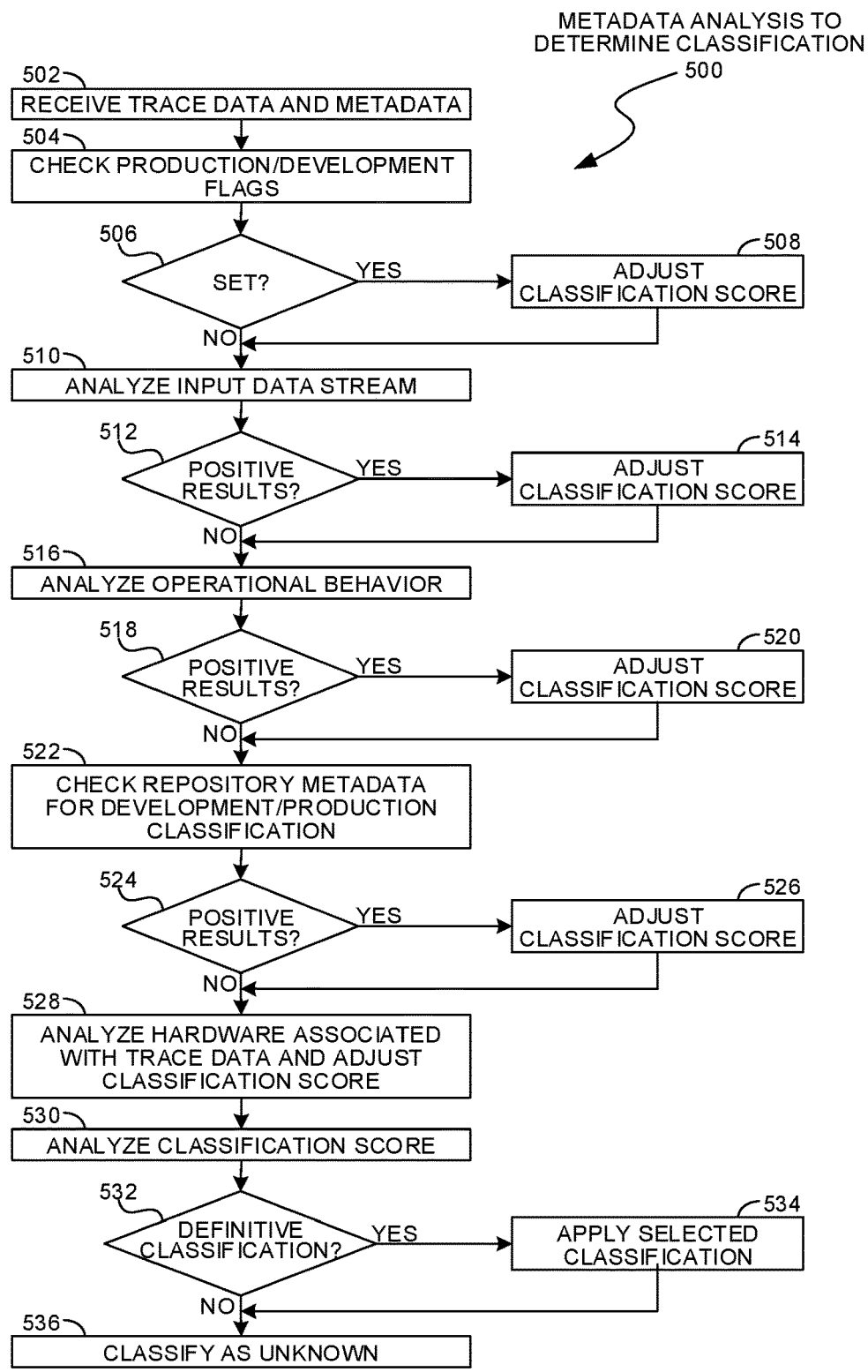
FIG. 5 is a flowchart illustration of an embodiment showing a method for analyzing metadata to determine a classification.

FIG. 5 is a flowchart illustration of an embodiment 500 showing a method for classifying tracer data by analyzing metadata. Embodiment 500 illustrates a detailed example of the operations that may be performed in block 404 of embodiment 400.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is one example of various metadata analyses that may be used to classify a trace dataset. In the example of embodiment 500, a classification score may be adjusted as each type of metadata is analyzed, and the final classification may be determined by a cumulative aggregation of each metadata analysis. Each used to make an adjustment may be made to the classification score may have a specific numerical factor or weighting applied. The weighting may be different for different conditions and different embodiments. Such an embodiment is merely one example of how to determine a classification for a trace dataset.

In block 502, the trace data and metadata may be received. Production/development flags may be checked in block 504. If the flags are set in block 506, the classification score may be adjusted in block 508.

Many systems may have flags or other metadata that may expressly identify a software version or an execution run as development or production. Such metadata may be gathered by a tracer prior to or during a tracer run. When such flags are present, the classification may be adjusted according to the flags or other indicators.

The input data stream may be analyzed in block 510. The input data stream may be analyzed to determine if the inputs to the application being monitored are known test data or appear to be test data. Test input data may be used to exercise a software component under test in a predictable and repeatable manner, so that various conditions may be repeatably replicated. In some embodiments, test data may be predefined, or may have various markers or other characteristics that may identify the input data as test data. When test data are present, the tracer data may be more likely development data as opposed to production data.

When the input data analysis may return statistically significant results in block 512, the classification score may be adjusted in block 514. When the input data analysis returns ambiguous or results that may not be statistically significant, the process may continue at block 516.

The operational behavior of the tracer data may be analyzed in block 516. Then the operational behavior analysis returns statistically significant results in block 518, the classification score may be adjusted in block 520. When the operational analysis returns ambiguous results or results that may not be statistically significant, the process may continue in block 522.

The operational behavior may reflect the manner in which an application behaved, and may be a similar analysis as the input data analysis except the analysis may use the output of the software component or the trace data itself as the indicator of development or production execution.

Applications executed in a production environment may have different behavior characteristics than applications executed in a development environment. Applications in a production environment may operate for long periods of time and may undergo repeating patterns of operation. For example, a production version of a website may have usage patterns that may repeat daily or weekly. In contrast, an application in development may execute under continuous load until a failure condition may be observed. In another example, an application in development may be executed under maximum loading, while an application in production may be load balanced or otherwise managed so that the application rarely experiences full load.

Repository metadata may be checked in block 522. The repository metadata may indicate a lifecycle stage of a software application or component. Some repositories may have flags, state indicators, or other mechanisms that may follow a software component from development through production. Repository metadata may include version numbers, version names, naming conventions, and other indicators that may indicate whether a version may be production or development. Such indicators may be useful indicators of trace data classifications.

When the repository metadata indicates statistically significant results in block 524, the classification score may be adjusted in block 526. When the repository metadata results are ambiguous, the process may continue to block 528.

Hardware configurations may be analyzed in block 528 and the classification score may be adjusted accordingly. The hardware configurations for production applications may differ from many development systems. In early development, some software components may be built and tested on personal computers or other development platforms. In production, an application may be deployed on production level hardware platforms, such as computer clusters or other hardware platforms. In some cases, development may be performed in virtual machines or hardware simulators, while production applications may be deployed on the actual hardware represented by the simulators.

By examining the underlying hardware, the development/production classification of a trace dataset may be made with some significance. The classification may be not be definitive by analyzing the hardware platform, as some development testing may be performed on production hardware, for example.

After performing the various analyses, a classification score may be analyzed in block 530. In many cases, the classification score may be compared to a predefined threshold to determine if the classification is development or production. When the determination is definitive in block 532, the selected classification may be applied in block 534. When the determination is not definitive in block 532, the classification may be made as 'unknown' in block 536.

Figure 6:
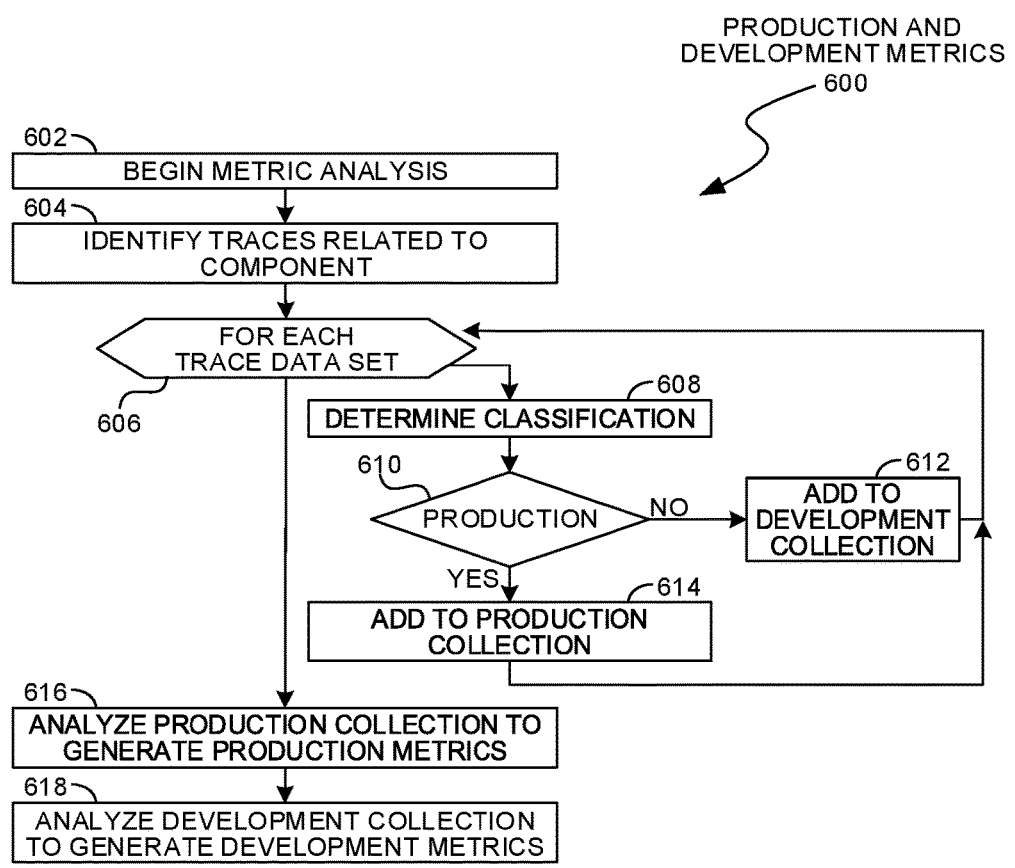
FIG. 6 is a flowchart illustration of an embodiment showing a method for creating production and development related metrics.

FIG. 6 is a flowchart illustration of an embodiment 600 showing a method for creating development metrics and production metrics. Embodiment 600 may perform classification, then perform analyses for production and development metrics.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The metric analysis may begin in block 602. The metric analysis may be requested for a specific software component. The software component may be a reusable component, such as a module or library, or may be a complete application or other standalone component.

The trace datasets associated with the software component may be identified in block 604. In some cases, the trace datasets may be any dataset that may be related to the selected software component, including production and development uses, as well as uses in different applications, hardware, and other configurations and settings.

Each dataset may be analyzed in block 606. The classification of the dataset may be determined in block 608.

In some cases, a user may be able to identify the conditions under which the user may define as production settings. For example, the user may determine an anticipated hardware configuration, performance levels, or other parameters that may define a production usage. In such cases, the user's input may determine which datasets may be considered as production datasets and which may be considered as development datasets in block 608. In other cases, the production/development classification may be determined using various other methods, such as those illustrated in embodiments 400 and 500. An example of a user interface to select a production definition is illustrated later in this specification.

If the classification is not production in block 610, the trace dataset may be added to a development collection in block 612. If the classification is production in block 610, the trace dataset may be added to a production collection in block 614.

After classifying and grouping the trace datasets in block 606, an analysis may be performed in block 616 to generate production metrics, and a second analysis may be performed in block 618 to generate development metrics.

Figure 7:
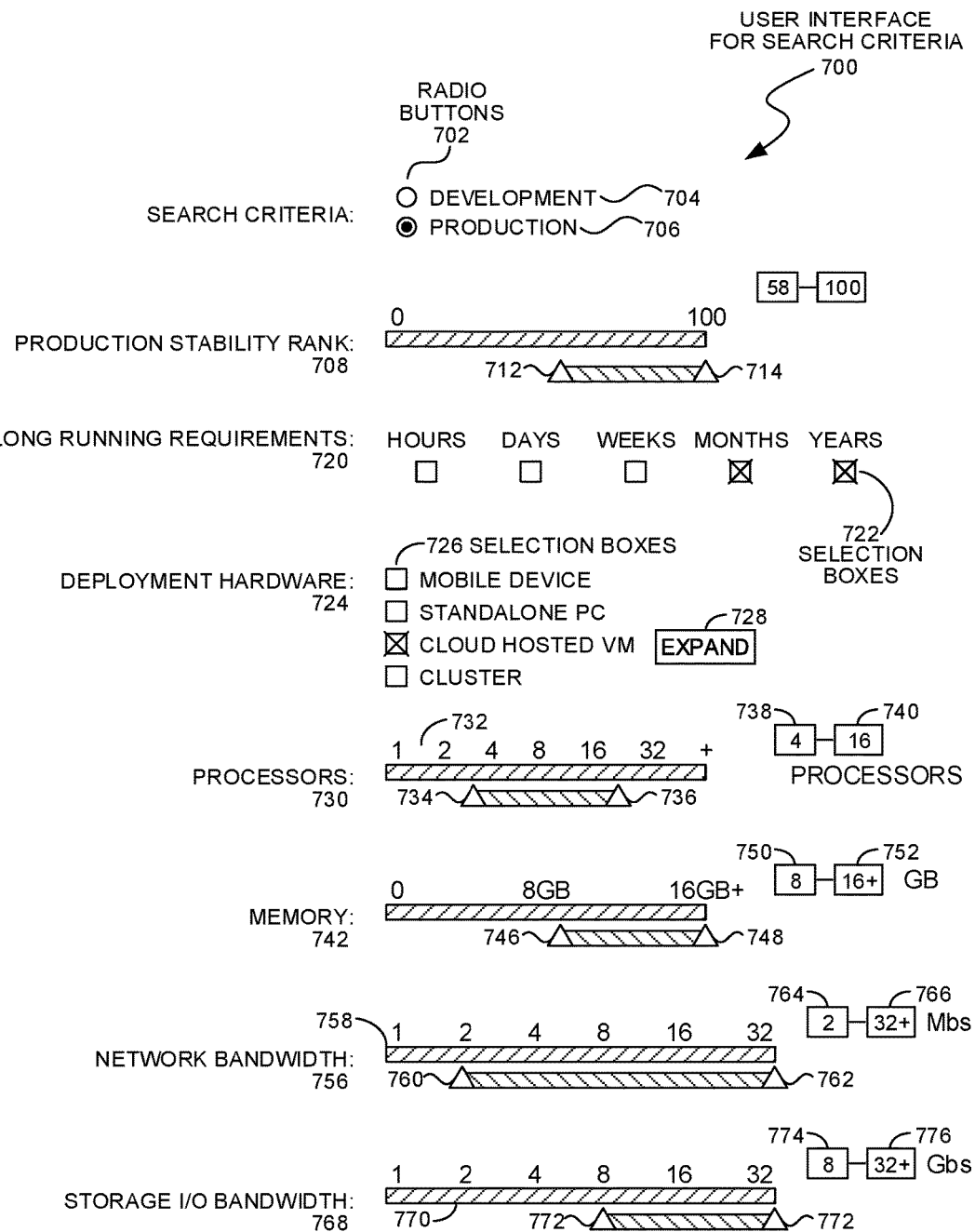
FIG. 7 is a diagram illustration of an example embodiment showing a user interface for selecting production level search criteria.

FIG. 7 is an example illustration of an embodiment 700 showing a user interface for selecting search criteria for production statistics. Embodiment 700 illustrates an example of several mechanisms for selecting parameters that may define a 'production' use of a software component. Embodiment 700 also illustrates several parameters that may be changed as part of such a definition.

The search criteria may be defined in part by a set of radio buttons 702 that allow a user to select between development 704 and production 706.

A production stability ranking 708 may be a parameter that indicates a software component's ability to operate in a production environment. The production stability ranking 708 may be an aggregated statistic that may be based on various parameters such as error handling, faults, memory usage analysis, network usage analysis, processor usage analysis, uptime, and other factors that may indicate robustness and general suitability for production usage.

The production stability ranking 708 may be expressed on a 0-100 scale 710. A user may select a range of production stability ranking by moving controls 712 and 714 to a location within the scale 710. In some cases, the user's selections may be seen numerically as items 716 and 718. In some user interfaces, the user may be able to type a desired number into items 716 and 718.

Long running requirements 720 may define the intended length of use for a production software component. A set of selection boxes 722 may be a user interface control that allows a user to select between hours, days, weeks, months, and years for the intended length of service.

The deployment hardware 724 may identify a set of production hardware configurations that a user may select with selection boxes 726. The production hardware configurations may include mobile devices, standalone personal computers, cloud hosted virtual machines, clusters, and other configurations. Some embodiments may include an expand button 728 that may present additional options to further define certain characteristics about the selected item.

Processors 730 may represent the number of cores or processors on which the production system may execute. A scale 732 may illustrate different numbers of processors and items 734 and 736 may be user interface controls that a user may move to select a range of processors. The range may also be input using items 738 and 740 in some embodiments.

Memory 742 may represent the amount of random access memory that may be made available to an application in a production environment. Again, the selection of a range of memory may be illustrated by a scale 744 and input using user controls 746 and 748. The results may be displayed and, in some cases, input using items 750 and 752.

Network bandwidth 756 may represent the bandwidth available to a production level use of an application. As before, the selection of a range of bandwidth may be illustrated by scale 758 and input using user controls 760 and 762. The results may be displayed and, in some cases, input using items 764 and 766.

Storage I/O bandwidth 768 may represent the speed or bandwidth of storage to a production use of an application.

Again, the selection of a range of storage I/O may be illustrated by scale 770 and input using user controls 772. The results may be displayed and, in some cases, input using items 774 and 776.

Figure 8:
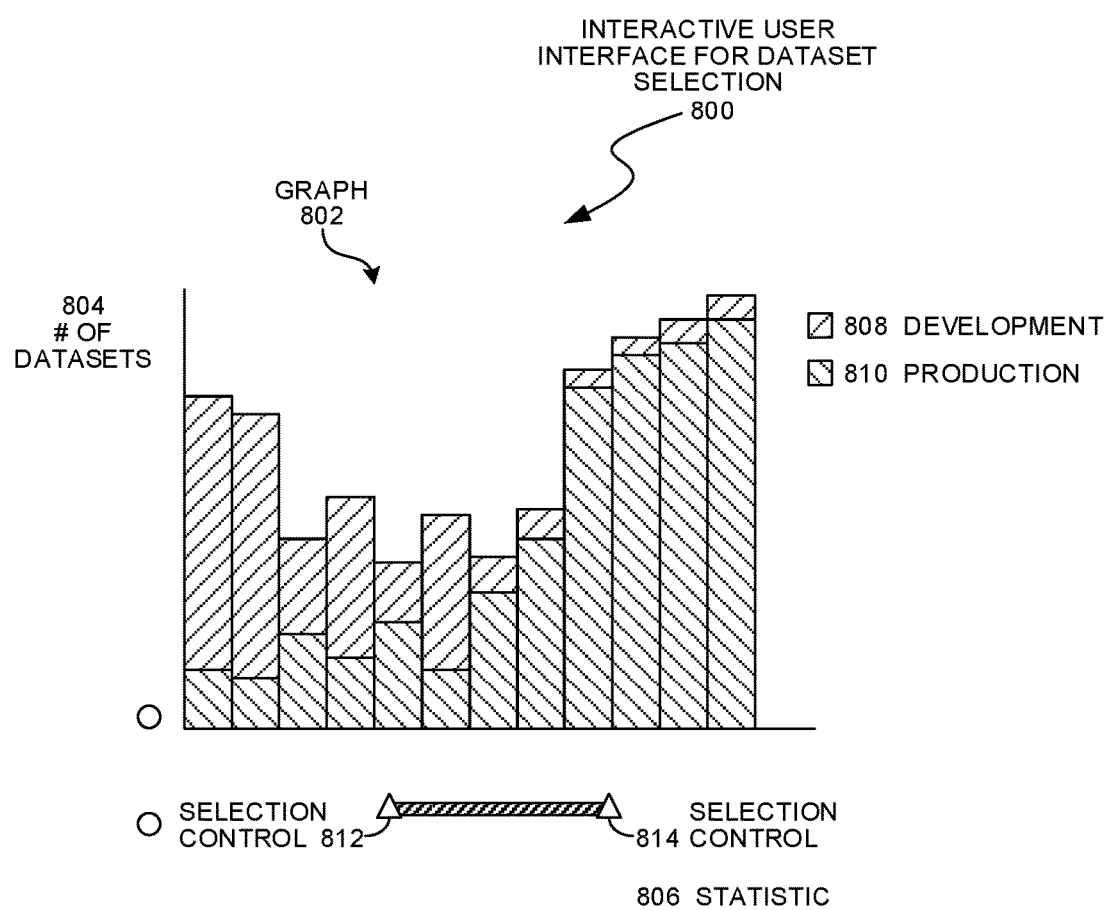
FIG. 8 is a diagram illustration of an example embodiment showing a user interface for selecting datasets for production level analysis.

FIG. 8 illustrates an example embodiment 800 showing a sample user interface mechanism that illustrates the number of datasets that may be available when selecting a range for analysis.

A graph 802 may be a stacked bar chart or other type of graph that has the number of available datasets 804 on the ordinate axis and the statistic 806 on the abscissa axis. The stacked bar chart may show the development 808 and production 810 datasets stacked on top of each other.

A set of selection controls 812 and 814 may be moved by a user to select the datasets bounded by the selection.

Embodiment 800 may be used when selecting production parameters, such as in embodiment 700 where several parameters may be selected. In a simple example, the selection statistic 806 may be production stability rank or some other statistic. By using the graph 802, a user may be able to visualize how many datasets may be stored for each level of a particular statistic, and then increase the range when little data are available or decrease the range when many datasets are available.

Figure 9:
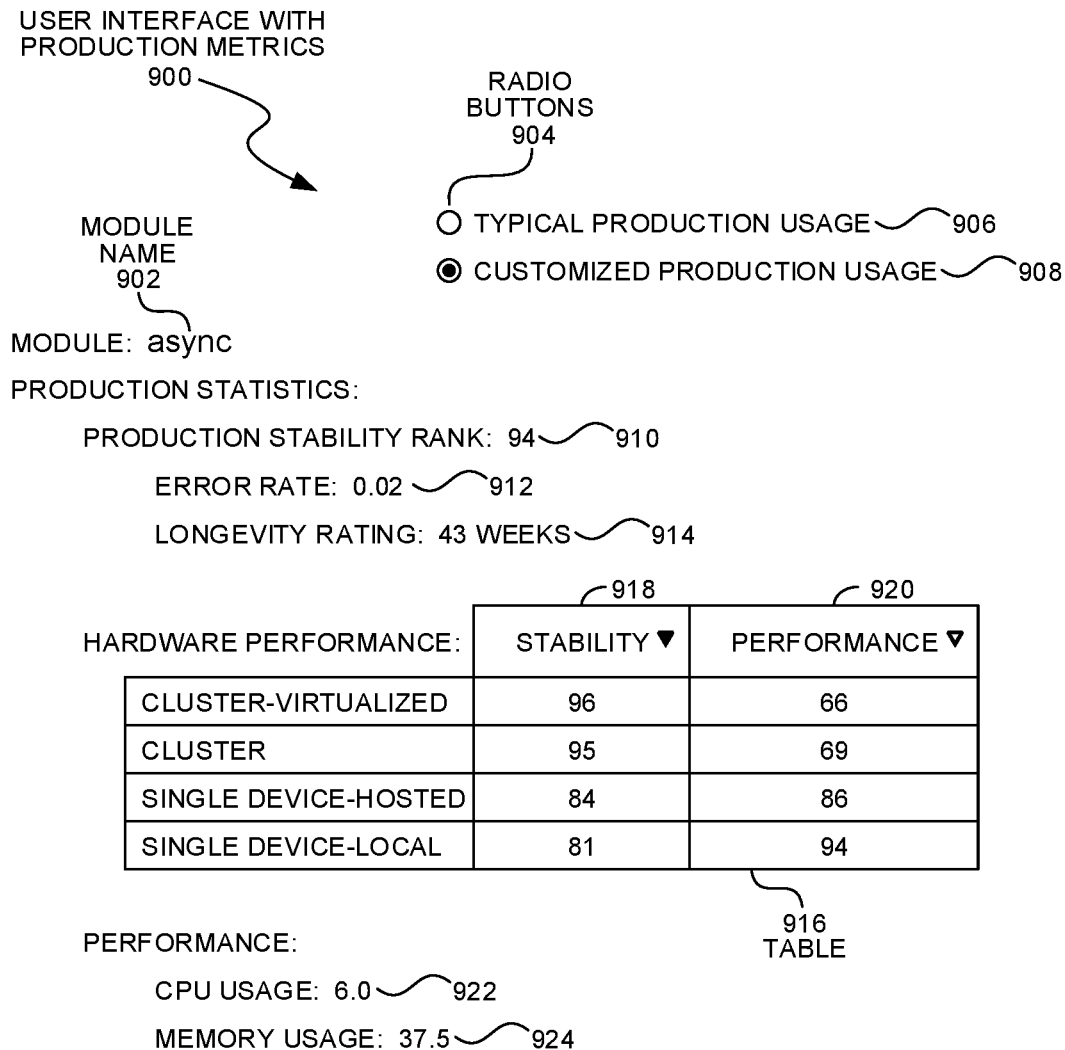
FIG. 9 is a diagram illustration of an example embodiment showing a user interface for displaying a module with production metrics.

FIG. 9 is an example embodiment 900 illustrating a user interface for displaying a module with production-level statistics. Embodiment 900 is merely one example of a user interface that has production-level statistics.

A module name 902 may indicate that the statistics shown are for a module named "async".

A set of radio buttons 904 may allow a user to select between a typical production usage 906 and a customized production usage 908. A typical production usage may be determined through a heuristic or other analysis, while a customized production usage 908 may be determined through a user interface such as that illustrated in embodiment 700. When a user selects the radio button corresponding to a customized production usage 908, the user may be presented with a user interface such as that of embodiment 700 to input or change the user's customized production definition.

The user's customized production definition may be used in block 608 of embodiment 600 to determine a collection of production trace datasets for analysis. The results of such analyses may be illustrated in embodiment 900.

The production statistics for the module may include a production stability rank 910, an error rate 912, and a longevity rating 914. These statistics may reflect characteristics that may be useful to a user who may be evaluating the module for use in a production environment. Depending on the user's desire for different production related metrics, the user may weight one or more of the various factors to determine a module's usefulness or may compare different modules using the statistics.

A table 916 may reflect various performance factors for the module on different hardware platforms. The platforms may include virtualized clusters, non-virtualized clusters, single device—hosted, and single device—not hosted. The table 916 may contain multiple performance related factors, such as stability 918 and performance 920. The user interface may allow the user to rank or sort the list by one or more of the various performance factors.

Additional performance factors may include CPU usage 922 and memory usage 924. Such factors may give the user an expectation for the resource load consumed by the module.

Figure 10:
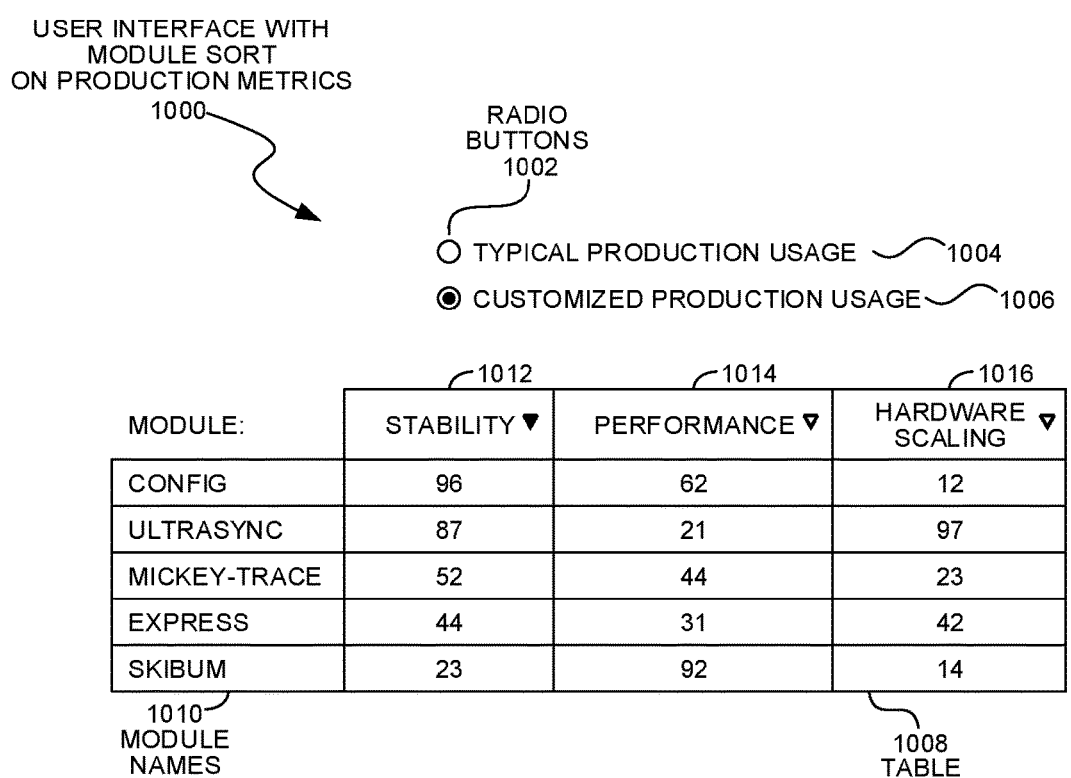
FIG. 10 is a diagram illustration of an example embodiment showing a user interface with multiple modules and their production performance metrics.

FIG. 10 is an example embodiment 1000 of an example user interface for displaying multiple modules using production statistics.

A set of radio buttons 1002 may allow a user to select between a typical production usage 1004 and a customized production usage 1006. A typical production usage may be determined through a heuristic or other analysis, while a customized production usage 1006 may be determined through a user interface such as that illustrated in embodiment 700. When a user selects the radio button corresponding to a customized production usage 1006, the user may be presented with a user interface such as that of embodiment 700 to input or change the user's customized production definition.

The user's customized production definition may be used in block 608 of embodiment 600 to determine a collection of production trace datasets for analysis. The results of such analyses may be illustrated in embodiment 1000.

A table 1008 may illustrate multiple modules which may be sorted by different production-related metrics. The table may include the module names 1010 and data for stability 1012, performance 1014, and hardware scaling 1016. Each of the various production-related metrics may be defined using heuristics, algorithms, or other mechanisms to define a comparison index for production-related factors. The production-related metrics may be calculated using production datasets that reflect either a typical production application or a user's customized production definition.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

The invention claimed is:

1. A system comprising:
   at least one computer processor;
   one or more computer-readable storage devices having encoded therein computer-executable instructions which, when executed on the at least one computer processor, configure the system to include:
   an interface that receives trace data collected from a plurality of executing applications;
   a classification engine that:
   analyzes a first time series of the trace data, and, as a result of the analysis of the first time series of the trace data:
   determines that the first time series is a production usage of a first executing application, and
   classifies the first time series as a production usage of the first executing application; and
   analyzes a second time series of the trace data, and, as a result of the analysis of the second time series of said trace data:
   determines that the second time series is a development usage of the first executing application, and
   classifies the second time series as a development usage of the first executing application.

2. The system of claim 1 further comprising:
a data analysis system that applies a first set of statistical analysis to trace data classified as production usage and applies a second set of statistical analysis to trace data classified as development usage.

3. The system of claim 1 further comprising:
an interface through which trace data having said production usage classification may be accessed separate from said trace data having said development usage classification.

4. The system of claim 3, said interface being an application programming interface.

5. The system of claim 3, said interface being a user interface.

6. The system of claim 1, said classification engine analyzing said first time series and said second time series with a set of heuristics.

7. The system of claim 1, said classification engine that classifies based on usage behavior observed in said first time series and said second time series.

8. The system of claim 7, said usage behavior being identified by analyzing incoming loads experienced by said first executing application.

9. The system of claim 8, said second time series being classified as development usage when said incoming loads are known test loads.

10. The system of claim 1, said classification engine that classifies based on hardware platforms on which said first executing application is executed.

11. The system of claim 10, said first time series being collected from a first hardware platform designated as a production hardware platform.

12. The system of claim 10, said second time series being collected from a second hardware platform designated as a prototype hardware platform.

13. The system of claim 1, said classification engine that classifies based on metadata identifying said first time series data being collected from a released version of said first executing application.

14. The system of claim 13, said classification engine that classifies based on said metadata identifying said second time series data being collected from a development version of said executing application.

15. A method performed on a computer processor, said method comprising:
receiving a first time series of trace data collected from a first executing application;
analyzing the first time series of the trace data;
as a result of the analysis of the first time series of the trace data, classifying the first time series as a production use of the first executing application;
receiving a second time series of trace data collected from the first executing application;
analyzing the second time series of the trace data;
as a result of the analysis of the second time series of the trace data, classifying said second time series as a development use of the first executing application.

16. The method of claim 15, said classifying being performed using a predefined heuristic.

17. The method of claim 15, said classifying being performed by analyzing input loads to said first executing application.

18. The method of claim 15, said classifying being performed by determining that said first executing application is released when generating said first time series.

19. The method of claim 15, said classifying being performed by analyzing metadata associated with said first time series and said second time series.

20. The method of claim 19, said metadata comprising version numbers for said first executing application.

21. A method performed on a computer processor, said method comprising:
receiving a request for a metric relating to production use of a first application;
identifying a first plurality of time series datasets gathered while monitoring the first application;
analyzing the first plurality of time series datasets;
based on the analysis, determining that each of said first plurality of time series datasets were taken during production use of said first application; and
generating the metric from said first plurality of time series datasets.

22. The method of claim 21 further comprising:
identifying a second plurality of time series datasets gathered while monitoring said first application;
determining that each of said second plurality of time series datasets were taken during development use of said first application;
generating said metric from said first plurality of time series datasets and said second plurality of time series datasets, and applying a first weighting to said first plurality of time series datasets and a second weighting to said second plurality of time series datasets.

23. The method of claim 22, said metric representing at least in part a fault tolerance of said first application.

24. The method of claim 22, said metric representing at least in part an error rate generated by said first application.

25. The method of claim 22, said metric representing at least in part a response to a load experienced by said first application.

26. The method of claim 25, said response being a response time.

27. The method of claim 25, said response being a resource utilization in response to a load.

28. The method of claim 27, said resource being a memory resource.

29. The method of claim 27, said resource being a network resource.

30. The method of claim 27, said resource being a compute resource.

31. A system comprising:
at least one computer processor;
a database comprising trace data gathered by monitoring an application, the trace data being time series datasets, each of the time series datasets being classified as production datasets or not production datasets;
a query engine executing on the at least one computer processor, said wherein the query engine:
receives a request for a metric relating to the production use of a first application;
identifies a first plurality of time series datasets gathered while monitoring the first application;
analyzes the first plurality of time series datasets;
based on the analysis, determines that each of the first plurality of time series datasets were taken during production use of the first application; and
generates the metric from the first plurality of time series datasets.

32. The system of claim 31, said query engine that further:
identifies a second plurality of time series datasets gathered while monitoring said first application;

determines that each of said second plurality of time series datasets were taken during development use of said first application;

generates said metric from said first plurality of time series datasets and said second plurality of time series datasets, and applying a first weighting to said first plurality of time series datasets and a second weighting to said second plurality of time series datasets.

33. The system of claim 32, said metric representing at least in part a fault tolerance of said first application.

34. The system of claim 32, said metric representing at least in part an error rate generated by said first application.

35. The system of claim 32, said metric representing at least in part a response to a load experienced by said first application.

36. The system of claim 35, said response being a response time.

37. The system of claim 35, said response being a resource utilization in response to a load.

38. The system of claim 37, said resource being a memory resource.

39. The system of claim 37, said resource being a network resource.

40. The system of claim 37, said resource being a compute resource.

41. A system comprising:
a database comprising:
trace data comprising performance data gathered by profiling a plurality of applications, each of the plurality of applications being traced for an execution run; and
metadata for each of the execution runs, the metadata including identification of a use scenario identifying one of a production use or a non-production use;
an interface that:
receives a request, the request comprising a use scenario;
retrieves a plurality of the execution runs having metadata matching the requested use scenario; and
returns at least one summary statistic representing the trace data for the plurality of execution runs having metadata matching the requested use scenario.

42. The system of claim 41, said request comprising an identifier for a first reusable software component.

43. The system of claim 42, said first reusable software component being a module.

44. The system of claim 42, said first reusable software component being an application.

45. The system of claim 41, said use scenario defining a production use.

46. The system of claim 45, said production use being defined at least in part by an expected execution run length.

47. The system of claim 45, said production use being defined at least in part by an expected deployment platform.

48. The system of claim 41, said interface being a user interface.

49. The system of claim 41, said interface being an application programming interface.

50. A method performed on at least one computer processor, the method comprising:
receiving a request for trace data for a first reusable software component, the request comprising a metadata descriptor defining an expected use scenario identifying one of a production use or a non-production use;
retrieving a plurality of execution runs, each of said execution runs matching the expected use scenario;
generating at least one summary statistic from the plurality of execution runs; and
returning the at least one summary statistic.

51. The method of claim 50, said request comprising an identifier for a first reusable software component.

52. The method of claim 51, said first reusable software component being a module.

53. The method of claim 51, said first reusable software component being an application.

54. The method of claim 50, said use scenario defining a production use.

55. The method of claim 54, said production use being defined at least in part by an expected execution run length.

56. The method of claim 54, said production use being defined at least in part by an expected deployment platform.

57. The method of claim 54, said production use being defined at least in part by an expected error rate.

* * * * *